United States Patent
Hibbs

(10) Patent No.: US 10,180,513 B2
(45) Date of Patent: Jan. 15, 2019

(54) METHOD FOR MAPPING THE PROPAGATION OF EARTH FRACTURES

(71) Applicant: GroundMetrics, Inc., San Diego, CA (US)

(72) Inventor: Andrew D. Hibbs, La Jolla, CA (US)

(73) Assignee: Groundmetrics, Inc., San Diego, CA (US)

(*) Notice: Subject to any disclaimer, the term of this patent is extended or adjusted under 35 U.S.C. 154(b) by 81 days.

(21) Appl. No.: 15/120,346

(22) PCT Filed: Feb. 20, 2015

(86) PCT No.: PCT/US2015/016809
§ 371 (c)(1),
(2) Date: Aug. 19, 2016

(87) PCT Pub. No.: WO2015/127198
PCT Pub. Date: Aug. 27, 2015

(65) Prior Publication Data
US 2017/0059738 A1    Mar. 2, 2017

Related U.S. Application Data

(60) Provisional application No. 61/942,952, filed on Feb. 21, 2014, provisional application No. 61/948,914, filed on Mar. 6, 2014.

(51) Int. Cl.
*G01V 3/26* (2006.01)
*G01V 11/00* (2006.01)

(52) U.S. Cl.
CPC ............ *G01V 3/26* (2013.01); *G01V 11/00* (2013.01); *G01V 2210/646* (2013.01)

(58) Field of Classification Search
CPC ..... G01V 11/00; G01V 2210/646; G01V 3/26
See application file for complete search history.

(56) References Cited

U.S. PATENT DOCUMENTS

| | | | |
|---|---|---|---|
| 4,825,165 A | 4/1989 | Helms et al. | |
| 5,747,750 A | 5/1998 | Bailey et al. | |
| 6,826,486 B1 | 11/2004 | Malinverno | |
| 2008/0259727 A1 | 10/2008 | Drew | |
| 2010/0259267 A1 | 10/2010 | Rosthal et al. | |
| 2011/0120702 A1* | 5/2011 | Craig | E21B 43/26 166/250.1 |
| 2011/0315378 A1 | 12/2011 | Homan et al. | |
| 2012/0158309 A1 | 6/2012 | Alshakhs | |
| 2014/0100786 A1* | 4/2014 | Ma | G01V 1/288 702/16 |

(Continued)

FOREIGN PATENT DOCUMENTS

| | | |
|---|---|---|
| WO | WO 2012/177349 | 12/2012 |
| WO | WO 2014/039618 | 3/2014 |

*Primary Examiner* — Roy Y Yi
*Assistant Examiner* — Geoffrey T Evans
(74) *Attorney, Agent, or Firm* — Diederiks & Whitelaw, PLC

(57) ABSTRACT

A method is provided for determining whether a change in a subsurface formation, such as fractures produced within the earth during a fracturing process, has reached and/or crossed a given boundary. The method provides near real time assessment of fracture propagation that can be used to guide a fracturing, particularly a hydrofacturing process.

25 Claims, 2 Drawing Sheets

(56) References Cited

U.S. PATENT DOCUMENTS

| | | | |
|---|---|---|---|
| 2014/0216730 A1* | 8/2014 | Ersoz | G01V 1/42 |
| | | | 166/250.1 |
| 2015/0107830 A1* | 4/2015 | Ersoz | E21B 43/263 |
| | | | 166/259 |
| 2016/0146963 A1* | 5/2016 | Hall | G01V 1/42 |
| | | | 166/250.1 |
| 2016/0160642 A1* | 6/2016 | Hall | E21B 43/267 |
| | | | 166/280.1 |
| 2016/0245048 A1* | 8/2016 | Jamison | E21B 44/00 |
| 2017/0045636 A1* | 2/2017 | Ma | E21B 43/26 |
| 2018/0016895 A1* | 1/2018 | Weng | E21B 49/00 |

\* cited by examiner

METHOD FOR MAPPING THE PROPAGATION OF EARTH FRACTURES

CROSS-REFERENCE TO RELATED APPLICATIONS

The present application represents a National Stage application of PCT/US2015/016809 entitled "Method for Mapping the Propagation of Earth Fractures" filed Feb. 20 2015, pending, which claims the benefit of U.S. Provisional Application Ser. No. 61/942,952 entitled "System and Method for Mapping the Propagation of Hydrofractures" filed Feb. 21, 2014 and U.S. Provisional Application Ser. No. 61/948,914 entitled "System and Method for Mapping the Propagation of Hydrofractures" filed Mar. 6, 2014, all of which applications are incorporated herein by reference.

BACKGROUND OF THE INVENTION

The present invention relates to a method for determining whether changes in subsurface formations, such as fractures, produced within the earth have crossed a given boundary. In particular, the method provides near real time assessment of fracture propagation that can be used to guide a hydraulic fracturing procedure.

Hydraulic fracturing (also known as hydrofracturing or fracking) is a technique used to increase hydrocarbon production in tight, low-permeability formations. A high-pressure fluid creates fractures in a subsurface rock, often a shale, which allows hydrocarbons to flow to a well bore. Fracking has enabled commercial production from unconventional formations. However, fracking is more expensive than the conventional methods used to produce gas and oil, and fracked wells exhibit a much faster decline in production than conventional wells. Furthermore, there are environmental concerns due to the amount of water that is needed and the possibility of fracture fluid propagating into undesired locations.

A paradigm for hydraulic fracture is shear failure on preexisting fractures and faults in the shale. This shear creates a network of relatively permeable flow paths and thus enhances productivity from the extremely-low-permeability formations. Microseismic events recorded during hydraulic fracturing are evidence of this shear, and the "clouds" of microseismic events associated with multiple hydraulic fracturing stages in a well are generally assumed to define the stimulated rock volume (SRV) from which the gas is being produced. However, in studies of both single and multiple wells, it has been shown that the number of microseismic events does not correlate with production. A simple mass balance calculation illustrates that the cumulative deformation associated with the microseismic events can account for only a small fraction of the production.

The particular defect in existing seismic methods for monitoring hydrofractures is that the underlying seismic data represent the fracture of the host rock rather than the passage of fluid into the new pore spaces and the resulting increase in porosity. As a result, seismic methods are not generally considered adequate for setting the parameters for hydrofracturing a given rock or shale. Furthermore, present seismic data processing takes many hours to complete, and even if the methods were deemed adequate, present seismic survey information cannot be used to guide and control a hydrofracturing operation in the field.

A particular need is to be able to monitor, during the course of a hydrofracturing procedure, whether fractures have propagated into a specific region. For example, it is of significant economic importance that the fractures reach fully into the space between well bores so that a potential hydrocarbon resource can be fully accessed. Conversely, it is also important to know if fractures have propagated out of a desired region, for example into a region that has already been fractured by an earlier hydrofracturing procedure (e.g., from an adjacent well), into a region leased or owned by another organization or above a certain vertical boundary where the fracturing is desired or allowed.

Electromagnetic (EM) methods can produce three-dimensional (3D) images of fluid distribution within the earth by mapping variations in electrical resistivity. Cross-well EM has been used throughout the world to image resistivity changes due to water and steam injection in deep (>5,000 ft) hydrocarbon reservoirs. The more recent method of borehole-to-surface EM (BSEM) can produce accurate images of fluid distribution up to 2 km from a well. However, the EM signal produced by hydrofracturing is limited by the small opening of the fractures and by the depth of present commercial tight formations, which can generally be 6,000 to 12,000 feet deep.

An advance in EM methods specifically for the deep subsurface is described in International Patent Application No. PCT/US2012/39010, entitled "System and Method to Measure or Generate an Electrical Field Downhole", by Hibbs and Glezer, which is incorporated herein by reference. As illustrated in FIG. 1, a subsurface electric current is forced to flow laterally through the ground (i.e., orthogonal to a vertical borehole) at a distance at least equal to the radial distance between the source and a number of counter electrodes located at a distance from the well on the order of the depth of the source electrode. This configuration increases the current flowing in the ground at formation depth and at a large lateral offset from the borehole. A further advancement described in International Patent Application No. PCT/US2013/058158, entitled "System and Method to Induce an Electromagnetic Field within the Earth", by Hibbs and Morrison, which is also hereby incorporated by reference, is to remove the source electrode at depth within the casing and instead drive the entire casing of the borehole at the desired voltage, V, by making an electrical connection at or near the top of the casing. For convenience, these EM source configurations, comprised of a conducting well casing and a suite of surface counter electrodes, are termed a Depth to Surface EM (DSEM) source.

Calculations have shown that the combination of a DSEM source with advanced EM sensors at the surface has the capability to detect the EM signal change produced by hydrofracturing a typical shale. In addition, it is possible that, by using fluid modified to have an enhanced EM signature, methods such as cross-well EM and BSEM will similarly be able to detect a hydrofracture signal.

However, calculating the field change due to a change in the distribution of electrical resistivity in the earth requires substantial computation. Moreover, there is no unique transformation connecting a given distribution of measured EM fields at the earth's surface to a specific distribution of subsurface resistivity. In practice, the best that can be done is to calculate iteratively the subsurface resistivity distribution that best matches the expected geology and measured surface field distribution. This lack of a unique inverse solution considerably increases the computational time and resources needed to interpret EM data. As a result, it is not feasible to process an EM signal change associated with a hydrofracturing operation in a time compatible with providing information to guide the hydrofracturing process.

Accordingly, there is a need to develop a practical method to conduct an EM survey and process the EM data in a short enough time that it can be used to decide whether to modify or cease an active hydrofracturing operation.

SUMMARY OF THE INVENTION

The present invention is directed to a method for determining whether a change in a subsurface formation, such as fractures produced within the earth during a fracturing process, have reached and/or crossed a given boundary. The method provides near-real-time assessment of fracture propagation that can be used to guide a fracturing, particularly a hydrofacturing, process. More specifically, the method is concerned with calculating the probability that a fracture has crossed a boundary by: calculating the range or distribution of a change in one or more subsurface properties resulting from the occurrence of fractures in a formation of interest; calculating the range of signal change at one or more measurement locations from the distribution of change in the one or more subsurface properties in a defined region; combining the signal change at one or more measurement locations for all regions where fractures are likely to have occurred in order for fracturing to reach a defined boundary; and comparing the distribution of signal change at one or more measurement locations with the calculated distribution of signal change due to fracturing for considering a probability that fractures have propagated to a boundary. In particular, the method is carried out during a fracturing process and employed in modifying one or more parameters of the fracturing process in order that a propagation of the fractures is changed during the process.

In broader terms, the method of the invention is used in calculating a probability that a change in subsurface formation has crossed a boundary by: calculating a distribution of a change in one or more subsurface properties resulting from an occurrence of the change in a formation of interest; calculating a range of signal change at one or more measurement locations from the distribution of the change in the one or more subsurface properties in a defined region; combining the signal change at the one or more measurement locations for all regions where a change in the formation is likely to have occurred in order for the change to reach a defined boundary; and comparing the distribution of change in the one or more subsurface properties with the range of signal change in calculating a probability that a change has propagated to the defined boundary. Again, the method is advantageously employed during a fracturing process and used to modify one or more parameters of the fracturing process in order that a propagation of the fractures is changed during the overall process.

Additional objects, features and advantages of the invention will become more fully apparent from the following detailed description when taken in conjunction with the drawings.

DETAILED DESCRIPTION OF THE INVENTION

The usual goal of an EM survey is to map a static resource in the earth's subsurface, such as an ore body or hydrocarbon bearing rock. Sometimes repeat surveys are done separated in time by six months or more to monitor a gradual change in a resource, such as the location of the oil to water boundary in an oil reservoir. For hydrofracturing, the formation changes over the course of hours and so the recording equipment is in place while the changes are occurring.

Further, in many traditional survey applications, the extent of the formation is known approximately, perhaps by being confined in one or more directions, and the goal of the survey is to more accurately quantify its physical extent. For hydrofracturing, the initiation point of the fractures is well defined by the location of the well stage undergoing fracturing, and the survey parameter of interest can be defined as whether the fractures emanating from that point have crossed a particular boundary in the subsurface volume around a well.

This restriction of time and space allows a complete redefinition of the output parameters of the survey. Rather than aim to determine the physical extent of a largely static formation, the physical arrangement of the survey equipment and the workflow of the survey data processing can be redesigned to determine the probability that fractures have propagated to, and are therefore present, in a given region. The benefit of a probabilistic formulation is that it can be calculated in real time from precalculated signal levels, without needing the step of inverting the EM data.

Specifically, in accordance with the invention, the approach proceeds as detailed herein. In a first step, the distribution of hydrofractures to be produced in the formation of interest is projected. The distribution of fractures can be estimated from rock mechanics models, prior pumping data, prior production data for the formation and other survey data, including survey data that is acquired in real time while the fracturing process is taking place. The distribution includes parameters such as the statistical distribution of fracture length, the number of fractures per unit length along a casing and the width of the fractures. The creation of these fractures can change one or more physical properties of the rock in the formation such as, for example, its average electrical resistivity, the anisotropy in its electrical resistivity, its average dielectric constant, its average magnetic permeability, the propagation of seismic waves or the presence of characteristic chemical compounds of elements. The changes in rock properties can arise due to the fracturing of the rock and/or the propagation of fluid, proppants, tracer chemicals and other additives used as part of the fracturing process or to enhance the signal change resulting from fracturing.

Figure 1:
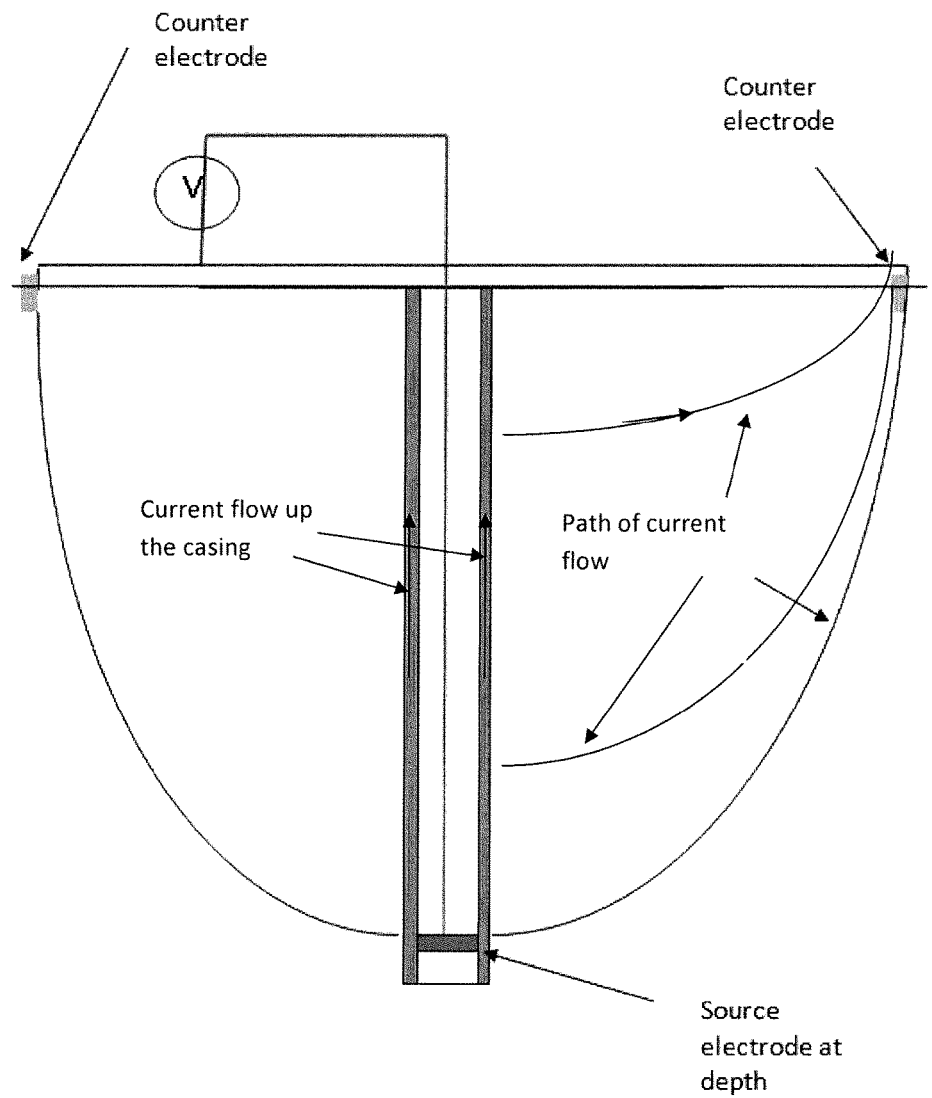
FIG. 1 illustrates a known borehole source configuration including a source electrode at depth within the borehole and two or more counter electrodes located at a significant lateral offset at the earth's surface.
Figure 2:
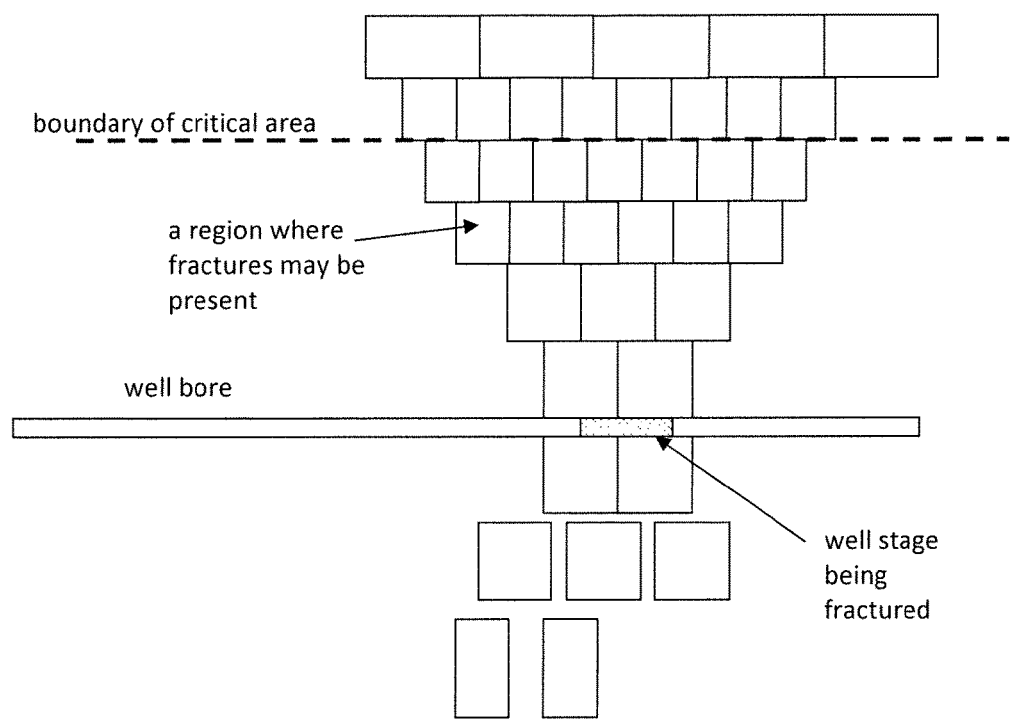
FIG. 2 is a plan view schematic diagram looking down into a well and illustrating the division, into individual regions, of a subsurface volume adjacent to the well and out to a boundary.

In a second step, the subsurface volume around the well is divided into regions where there is reasonable probability that a fracture initiated at a given stage (section of well) in the fracturing operation will propagate out from the well. These regions extend from the stage being fractured to the boundary, or boundaries, of interest, as illustrated in FIG. 2. The size of each region depends on the desired resolution in estimating the extent of fracture propagation and practical issues, such as the depth of the well and the smallest resolvable signal change at the surface. For example, a region can have physical dimensions of approximately 10 m to 50 m in lateral extent. The regions are not required to have the same size as each other, have equal size in each direction or contact each other, as indicated in FIG. 2. Generally, a particular region is not centered on the well, but rather located entirely on one side of the well so that the direction of fracture propagation (e.g., upwards or to the left of the well) can be determined.

In a third step, the change in EM field (which in accordance with the invention can be based on one or more components of the EM field, such as the electric field only as discussed below) resulting from each subsurface region becoming fractured is calculated. Such a calculation is known as a forward model. For EM soundings, fractures cause a change in electric current flow within a region. The change in EM field at any point in the subsurface, surface or even above the surface can be directly calculated from this change in current flow in a region. This calculation is computationally efficient and even distant regions where the probability of fracture propagation is very low can be included.

In a fourth step, the total surface signal for fractures reaching a given boundary region is calculated by adding the signals for each region likely to be fractured and for fractures to have propagated to the given boundary region. This calculation is also simple and, further, can be performed in advance or quickly updated during the fracturing process by defining new combinations of subsurface regions to be incorporated in the fracture path, depending on new information, intuition or opinions from the field.

By this method, the range of total signal change expected at each measurement location for fractures reaching a given boundary region can be determined in advance or, if desired, at the time the fracturing is taking place. The result is a spatial distribution of a projected signal across the sensor array for each fracture propagation pattern that results in fractures reaching a specified boundary region. For example, for fractures to cross a boundary region 300 m from a well, there are a suite of likely fracture regions to be summed.

The data recorded by the sensors can then be compared to each of the pre-calculated distributions of recorded signal across the sensor array. Because of the statistical nature of the fracture parameters or patterns in the earth and the finite measurement sensitivity and accuracy of the sensors, the most appropriate metric is to quantify the probability that a given fracture distribution is consistent with the measured data. The result is a set of probabilities as to whether each of a set of connected fracture regions that combine to reach a defined boundary is consistent with the measured data. Such probabilities can be calculated in seconds to minutes using a computer of moderate size and cost.

The total probability that fractures have reached a given boundary region, or equivalently crossed a given boundary, can then be calculated either by determining whether one pattern of connected fracture regions agrees with the data with high probability or whether the total probability of a set of such fractured regions or patterns, added by the usual laws of probability, similarly agrees with the data with high probability. These hypotheses can be tested for each boundary region of interest. The total calculation time is again very small compared to traditional forms of EM data processing.

By downloading data continually from the sensors, the probability that fractures have reached one or more boundary regions can be quantified in near real time. Once this probability exceeds a predetermined level, the fracturing procedure can be modified or stopped. This means that the volume of fracturing fluid used to produce a given well can be reduced and the likelihood of fractures propagating into undesired regions can also be reduced.

For a given fracturing operation, the boundaries where fracture propagation is to be particularly monitored can be defined in advance. For example, for two adjacent wells, one boundary is a plane equidistant between them. Another boundary is the edge of the asset, adjusted by whatever safety margin is considered appropriate. The distribution of sensing locations can then be designed to increase the accuracy of determining whether a fracture or fractures have crossed one or more boundaries. For example, the sensor density can be increased proximate to a boundary and/or sensors can be oriented in a preferred direction relative to the boundary.

Furthermore, a primary aspect of many fracturing procedures is to inject proppant into fractures in order to hold them open and thereby modify the flow of hydrocarbons and other mobile substances within the fractured region. Therefore, a question of key importance is to map the propagation of the proppant within the earth. One method to do this is to monitor the propagation of the fluid and calculate the propagation of the proppant by using models based on the fluid flow. A second method is to modify the proppants to have a particular EM signature. For example, proppants can be adapted to be highly electrically conducting, and, after fluid flows back from the formation, the spatial distribution of the proppants trapped in the formation can be imaged by an appropriate EM-based method. Similarly, the proppants can be adapted to have a particular frequency dependency in their electrical response. In addition, the spatial distribution of proppants within the fluid, and/or after fluid has left the region of interest, can be mapped.

Although the invention has been described as being applicable to DSEM and enhanced forms of BSEM and cross-well EM, the invention can also be employed in connection with other EM modalities used for monitoring subsurface formation changes. Current examples include: surface to borehole EM, wherein EM sensors are located in a borehole and one or more EM sources are deployed at the surface; novel forms of cross-well EM, wherein multiple well bores and/or casings are used as part of the source; and electrical resistance tomography, wherein suites of downhole electrodes in proximate wells are variously paired as sources and sensors. For very shallow and/or very large fractures, it is even possible that EM sensors and source electrodes deployed entirely at the surface without the assistance of a casing could be viable.

Furthermore, although the problem has been described in connection with hydrofracturing, the invention is applicable to other time-varying changes to a formation, such as the movement of an oil-to-water contact, the injection of a $CO_2$ plume and the sudden appearance of a body of steam due to an unintended release. The changes in signal at the measurement locations may well be much larger for other applications such as these, and, if so, the timescale over which the probability that a boundary has been reached would be reduced accordingly.

The invention can be further improved by incorporating data recorded by other sensors. For example, a real time measurement of the total volume of fracture fluid that has been pumped into the formation for a given fracture stage can be included in choosing the number of possible connected fractured regions to be added when determining the total probability that a set of such fractures have reached a specified boundary region based on the data with high probability. If the total volume of fluid pumped is small, then it is physically unrealistic to include many combinations of fractured regions.

Similarly, data from seismic sensors can be included if the sensors exhibit a sufficiently short latency. As with EM inversion, seismic inversion generally requires days of processing time to locate the region where the seismic signal originated. However, reduced forms of seismic processing can potentially be included in a manner similar to the pumping data. For example, if the number of seismic events in a single large volume around the well can be estimated in near real time, the estimate can be used to bound the number of regions included in the total probability estimate.

Further, although described with particular focus on the use of EM methods to image the propagation of fracture fluid, it should be noted that the above-described approach is not limited to EM methods or fracture fluid. For example, the approach can be applied to seismic methods by precalculating the distribution of seismic signal amplitudes associated with fracturing in the host formation. The seismic signal strength at the surface can be precalculated for each subsurface region and the probability that the measured data corresponds to these calculated fields determined in near real time, as with the EM example.

A further aspect of the invention is to apply data measured during the initial part of the fracturing process to calibrate the later result when fracturing is reaching the boundary. To reach a boundary, pumped fracture fluid must first penetrate the region near to the well. This means that measured data acquired soon after pumping begins at a well stage corresponds to regions closer to the well stage. For borehole-based EM, the surface signal change is generally larger for changes in rock resistivity near to the well, and the number of locations to be included in producing the total signal is less. Accordingly, the early stage signal has relatively high precision compared to signals produced later when the fractures are expected to approach a boundary. Thus, the early signal can be used to calibrate the signal propagation through the earth to the measurement point, and thereby improve the accuracy of estimating when fractures propagate across a boundary.

In any case, although described with reference to preferred embodiments of the invention, it should be readily understood that various changes and/or modifications can be made to the invention without departing from the spirit thereof.

The invention claimed is:

1. A method for determining if a fracture has crossed a boundary comprising:
   determining a distribution of a change in one or more subsurface properties resulting from an occurrence of fractures in a formation of interest;
   determining a range of signal change at one or more measurement locations from the distribution of change in the one or more subsurface properties in a defined region where fracturing is targeted;
   combining the signal change at the one or more measurement locations where fractures are likely to have occurred in order for fracturing to reach a defined boundary, wherein the defined boundary borders the region where fracturing is targeted; and
   comparing a distribution of signal change at the one or more measurement locations with the calculated range of signal change due to fracturing for considering a probability that fractures have propagated to the defined boundary.

2. The method of claim 1, wherein the fractures are created by a process of hydrofracturing.

3. The method of claim 1, wherein one or more of: a) the change in the one or more subsurface properties, b) the range of signal amplitude at the one or more measurement locations, and c) the combined signal change from likely regions, are calculated before fractures are created in the volume of interest.

4. The method of claim 1, wherein the one or more measurement locations are located within a borehole or on an outside of a borehole casing.

5. The method of claim 1, wherein an electrical resistance tomography method is used to measure the change in the one or more subsurface properties.

6. The method of claim 1, wherein signal changes are combined from regions for which a projected signal at a measurement location exceeds a defined threshold.

7. The method of claim 1, wherein each region is selected, at least in part, based on a volume of fluid that has been pumped into or out of the region.

8. The method of claim 1, wherein the probability that fractures have propagated to the defined boundary is used to modify a fracturing process.

9. The method of claim 8, wherein the probability that fractures have propagated to the defined boundary is used to modify the fracturing process while fracturing is taking place.

10. The method of claim 1, wherein the defined boundary borders a region where fracturing is not targeted.

11. The method of claim 1, further comprising:
    determining the probability that fractures have propagated to the boundary during a fracturing process; and
    modifying one or more parameters of the fracturing process in order that a propagation of the fractures is changed.

12. The method of claim 11, further comprising, in connection with determining the distribution of the change:
    monitoring a signal from a formation region that is characteristic of an occurrence of fractures within that formation; and
    comparing a value of the signal that is monitored with a value characteristic of a spatial distribution of fractures within the formation while the fracturing process is underway.

13. The method of claim 12, wherein the signal is directly related to a fluid injected into the formation region with an intent of causing fractures.

14. The method of claim 12, wherein the signal is derived from a change in one or more components from an electromagnetic property of the formation region.

15. The method of claim 12, wherein the signal is due to a change in subsurface resistivity due to a propagation of fractures.

16. The method of claim 12, wherein the signal is due to a propagation of fluid or proppant in the fractures.

17. The method of claim 12, wherein the value characteristic of the spatial distribution of fractures within the formation is pre-calculated, in advance of the fracturing process underway, based on a model of the fracturing process.

18. The method of claim 11, wherein the one or more parameters is a flow rate of a fluid or fluid component used to induce or otherwise influence the fracturing process.

19. The method of claim 11, wherein the one or more parameters is an amount or composition of proppant added to a fluid used to induce or otherwise influence a fracture structure of the formation region after the fracturing process is complete.

20. A method for determining if a change in subsurface formation has crossed a boundary comprising:

determining a distribution of a change in one or more subsurface properties resulting from an occurrence of the change in a formation of interest;

determining a range of signal change at one or more measurement locations from the distribution of the change in the one or more subsurface properties in a defined region where fracturing is targeted;

combining the signal change at the one or more measurement locations where a change in the formation is likely to have occurred in order for the change to reach a defined boundary, wherein the defined boundary borders the region where fracturing is targeted; and comparing the distribution of change in the one or more subsurface properties with the range of signal change for considering a probability that a change has propagated to the defined boundary.

21. The method of claim 20, further comprising:

calculating the probability that a change has propagated to the defined boundary during a fracturing process, with the change being fractures; and modifying one or more parameters of the fracturing process in order that a propagation of the fractures is changed.

22. The method of claim 21, wherein the change in the formation is due to the propagation of a fluid used to induce fractures during the fracturing process.

23. The method of claim 21, wherein the change in the formation is due to a propagation of a proppant.

24. The method of claim 21, wherein the change in the one or more subsurface properties is the electrical resistivity of the formation and is related to the propagation of fluid and/or proppant transported by the fluid.

25. The method of claim 21, wherein the probability that a change has propagated is used to modify a procedure, or aspect of a procedure, used to induce or otherwise influence fractures in the formation.

* * * * *